(12) United States Patent  (10) Patent No.: US 8,096,536 B2
Steele  (45) Date of Patent: Jan. 17, 2012

(54) ALIGNMENT TOOL FOR USE IN SOLDERING ROUGHED-IN SERVICE PIPES

(76) Inventor: Perry Anthony Steele, Douglas City, CA (US)

( * ) Notice: Subject to any disclaimer, the term of this patent is extended or adjusted under 35 U.S.C. 154(b) by 907 days.

(21) Appl. No.: 11/611,112

(22) Filed: Dec. 14, 2006

(65) Prior Publication Data

US 2008/0142574 A1   Jun. 19, 2008

(51) Int. Cl.
  *B25B 5/06*  (2006.01)
(52) U.S. Cl. .................................. 269/6; 269/43; 269/3
(58) Field of Classification Search .................... 269/37, 269/41, 43, 45, 152, 155, 3, 904
See application file for complete search history.

(56) References Cited

U.S. PATENT DOCUMENTS 3,097,843 A * 7/1963 Morrow ........................... 269/40
5,058,869 A * 10/1991 Ruthven ......................... 269/45

* cited by examiner

*Primary Examiner* — Lee D Wilson
(74) *Attorney, Agent, or Firm* — Marc E. Hankin; Kevin Schraven; Hankin Patent Law, APC

(57) ABSTRACT

One embodiment of the invention is directed toward an alignment device for soldering roughed-in pipes for plumbing applications that assists plumbers by acting as a third hand for the plumber. One portion of the device removably attaches to a plumbing wall-strap while another portion of the device holds one or more pipes perpendicularly in place, in order that a plumber may solder the pipes in place without the need for assistants or additional tools.

3 Claims, 3 Drawing Sheets

ALIGNMENT TOOL FOR USE IN SOLDERING ROUGHED-IN SERVICE PIPES

FIELD OF INVENTION

This invention relates, generally, to alignment tools for welding and soldering; more particularly, to an alignment tool for use in soldering roughed-in service pipes for plumbing.

BACKGROUND

In performing rough-installations of plumbing in buildings, plumbers commonly use wall-straps of the type disclosed by U.S. Pat. No. 3,097,843 to Morrow. Morrow's wall-strap, and the subsequent variations on the device, disclose a wall-strap that assist plumbers with rough-in installation of water piping by providing a strap that attaches between wall studs with holes through which a plumber may pass horizontal water pipes. The wall-straps commonly feature holes that are aligned at specific distances from the center of the studs, in order that the pipes may be passed horizontally through the correct location for the later installation of sinks, lavatories, flush valves, water heaters, and other plumbing fixtures.

In the common sequence of constructing buildings, plumbing rough-in is performed after the studs are installed in a building. Thus, a plumber will typically visit a project, install water piping, install horizontal temporary end-sections of hot and cold water piping (commonly called, "stub outs") through the wall-strap, and cap the ends of the pipes. Then the plumber typically leaves the project until the drywall or wallboard work is complete. Then the plumber returns to the project to complete the work, which includes installing plumbing fixtures and connecting the plumbing valves to the horizontal temporary end-sections (stub-outs) of water pipes that were previously installed.

For plumbers that are careful in producing high quality rough-in and finish work, a problem arises of carefully aligning the temporary end-sections of the water pipes such that they are horizontal and perpendicular to the wall surface. While the wall-strap holds the pipes in place, it does not steadily secure them such that they may not become misaligned. Also, because two hands are required to complete soldering (one to hold the solder and the other to hold a torch) it is impossible for a plumber working alone to properly align the temporary end-section of the water pipes while soldering. Therefore, it is difficult for plumbers to install true, horizontal pipes and to be able to aim the water connection in the wall, horizontality or vertically without the help of an assistant or other party.

Also, while several "third-hand" devices have been developed in order to assist with welding and soldering jobs, none is suitable for this application. U.S. Pat. No. 555,624 to Slotkin, for example, discloses a soldering clamp for plumbers that comprise a series of vices that are held together upon a centrally-pivoted yoke that allows pipes to be held in place for soldering. While such a device is useful for bringing together pipes of varying angles, it fails to provide a means for aligning a pipe perpendicularly to a common plumbing wall-strap.

Another device, which is useful for aligning pipes perpendicularly, is disclosed by U.S. Pat. No. 2,853,771 to Melville. Melville's patent discloses a device that allows one worker to form leaded joints between pipes by supporting a pipe to be welded perpendicularly or at a specific angle which is selected by the pipe fitter. While Melville's device is useful for reducing the manpower required for certain pipe-fitting applications, it cannot be used in order to align hot and cold water stub outs for soldering.

Another work holding tool for supporting articles for welding or gluing is disclosed by U.S. Pat. No. 4,185,811 to Long. Long discloses a clamp which may be held and operated by one hand. While Long's device is useful for holding two objects together and allowing a welder or plumber to weld or solder the objects, the device is not useful in soldering pipes perpendicular to a wall.

A device for welding pipes perpendicular to one another is disclosed by U.S. Pat. No. 6,161,296 to Davio. Davio's device features a saddle and clamp for fastening a pipe in place perpendicular to an object onto which the device is attached. In this manner, Davio's device assists a welder in aligning the pipes to be welded by securely holding the pipes in a perpendicular position while they are welded. Davio's device, however, is not tailored for use in applications such as the installation of hot and hold water pipe stub outs through a plumbing wall-strap.

Another clamp for aligning work-pieces in a perpendicular fashion is disclosed by U.S. Pat. No. 6,491,294 to Hyatt. Hyatt's patent discloses a perpendicular bar clamp that features a C-clamp and a pipe-clamp that is aligned perpendicularly to the C-clamp. The invention allows the C-clamp to be attached to an object and a pipe or similar such object aligned perpendicularly to the object, through the pipe-clamp. In this manner, Hyatt's device discloses a means for aligning two items, such as pipes, perpendicularly for welding. While this device is useful for many perpendicular applications, it fails to disclose a means for aligning pipes perpendicularly to plumbing wall-straps.

Other welding clamps, commonly used in the industry are similarly inapplicable for this purpose. 3-Jaw clamps and other third-hand clamps found on the market are not designed for the purpose of aligning pipes at a right angle to wall-straps.

Therefore, there remains a long felt need in the art for a plumbing clamp or tool that aligns pipes normal to the plane of a plumbing wall-strap and maintains the position of the pipe so that both of the plumber's hands may be used to solder a horizontal stub out to a vertical water pipe.

SUMMARY OF THE INVENTION

One embodiment of the invention is directed towards overcoming the above shortcomings by disclosing a tool for removably fastening plumbing pipes to wall-straps at right angles to the plane of the wall-strap. In one embodiment of the invention, the tool comprises a handle with a slotted block at the distal end, into which fits a typical wall-strap. Because walls straps are typically on the order of 1/16" thick or less, the slot opening is slightly larger to allow the strap to be inserted. The slot may additionally be configured with an adjustable clamp, such that when placed onto the wall-strap, the clamp can be pressured to attach to the wall-strap. Other attachment means for attaching the handle to the strap are known within the art and remain within the contemplation of various embodiments of the invention.

Another component of the tool is used to attach and align pipes to the tool. In one embodiment of the invention, the pipes are attached to the tool by round openings slightly larger than the outside diameter of common plumbing pipes, which feature thumb-screws for fastening the pipe to the tool to be able to rotate and hold in place at any angle. The openings are aligned at a right angle to the slot in the tool, such that when the tool is attached to the wall-strap, a pipe placed in the tool will extend in a direction 90 degrees to that of the wall-strap. The tool may feature two or more openings, for accommodating pipes of two or more sizes. Also, in one embodiment of the invention, the tool features openings on either side of the tool, such that two pipes may be aligned at the same time. Also, the openings may be spaced to match the holes in wall-straps, which correspond with industry-standard spacing arrangements for water pipes. Other attachment means for attaching a plumbing pipe to the tool are known within the art and remain within the contemplation of the invention.

The claimed tool is used to align pipes and the like. The method for doing so involves a kit of the claimed apparatus comprising a shaft, mount and extension; a wall-strap; one or more generally perpendicular pipes soldered to the wall-strap; and a torch to solder, which is used to affix the generally perpendicular pipe to the wall-strap. The tool is mounted to the top of the wall-strap. The generally perpendicular pipes are inserted through the openings on the tool, and then through the holes on the wall-strap. This will enable the user to use a torch to solder the pipe to the wall-strap when the pipe is positioned and stays in a position that is perpendicular to the wall-strap and therefore, perpendicular to the studs inside the wall. Then the tool is removed.

In one embodiment of the invention, two slots are included at the distal end at the handle, such that the tool is reversible and may be used to align pipes on either side of the tool. In another embodiment of the invention, the tool features openings on both sides of the handle that are configured to match the openings on common plumbing wall-straps. In this manner, the tool can be used to align both a hot and cold water pipe at the same time, while allowing the plumber to solder both, without removing and re-attaching the plumbing tool. In another embodiment of the invention, the tool features multiple openings, such that it may accommodate pipes of multiple sizes.

In this manner, the invention discloses a tool for easily and effectively aligning plumbing pipes perpendicularly to wall-straps. While other uses of the invention are contemplated, the invention is particularly useful for soldering plumbing stub outs, where short sections of pipe must be soldered to vertical pipe sections, or connecting Pex pipe in any direction in the wall. The tool allows a plumber to make these connections without the need of an assistant or other such tool to hold the stub out in place during soldering. Using the tool allowing a plumber to produce work that reflects high-quality workmanship, without the need for costly additional manpower or tools.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive. Also, the reference or non-reference to a particular embodiment of the invention shall not be interpreted to limit the scope of the invention.

In the following description, certain terminology is used to describe certain features of one or more embodiments of the invention. For instance, "pipe" refers to any piping, tubing, such as copper pipe, or other such article to be welded or soldered; and "wall-strap" refers to any bracket or support attached to wall studs or pipes that is used to support, attach, or align pipes, and "stub out" refers to any section of pipe that is to be welded, soldered or crimped.

Figure 1:
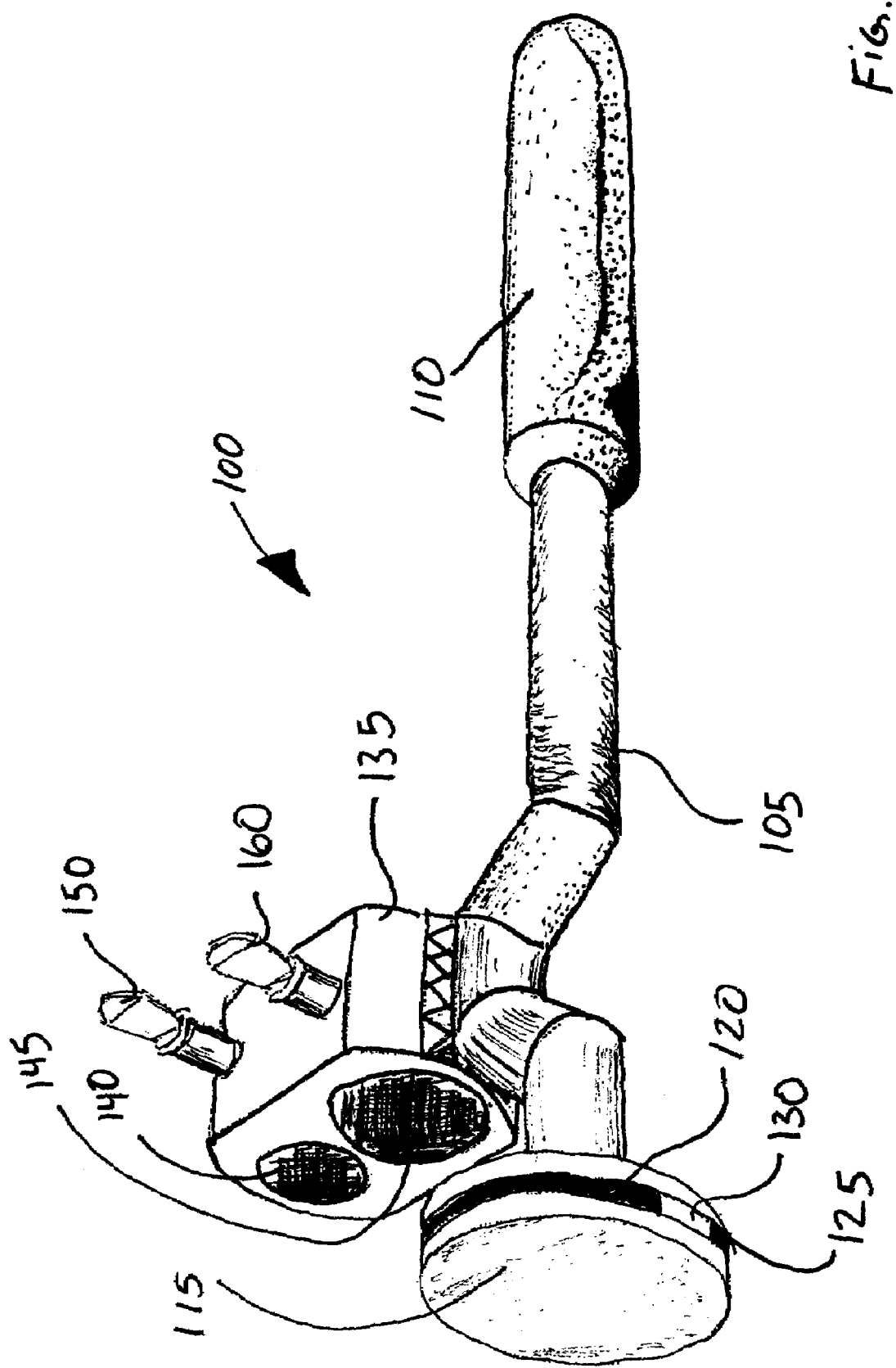
FIG. 1 is an illustration from a perspective view showing one embodiment of the invention.

FIG. 1 is an illustration from a perspective view showing one embodiment of the invention. A pipe alignment tool 100 is shown along with its constituent parts, including the handle 105, the hand grip 110, the wall-strap mount 115, and the pipe mount 135. The wall-strap mount 115 features a top opening 120 and a bottom opening 125, which are separated by a divider 130. The pipe mount 135 features a first pipe insert 140 for mounting a pipe and a second pipe insert 145 for mounting a pipe of a second size. The first pipe insert 140 features a first thumb-screw 150, which removably attaches a pipe of a first size to the tool 100 and the second pipe insert 145 features a second thumb-screw 160, which removably attaches a pipe of a second size to the tool 100.

Figure 2:
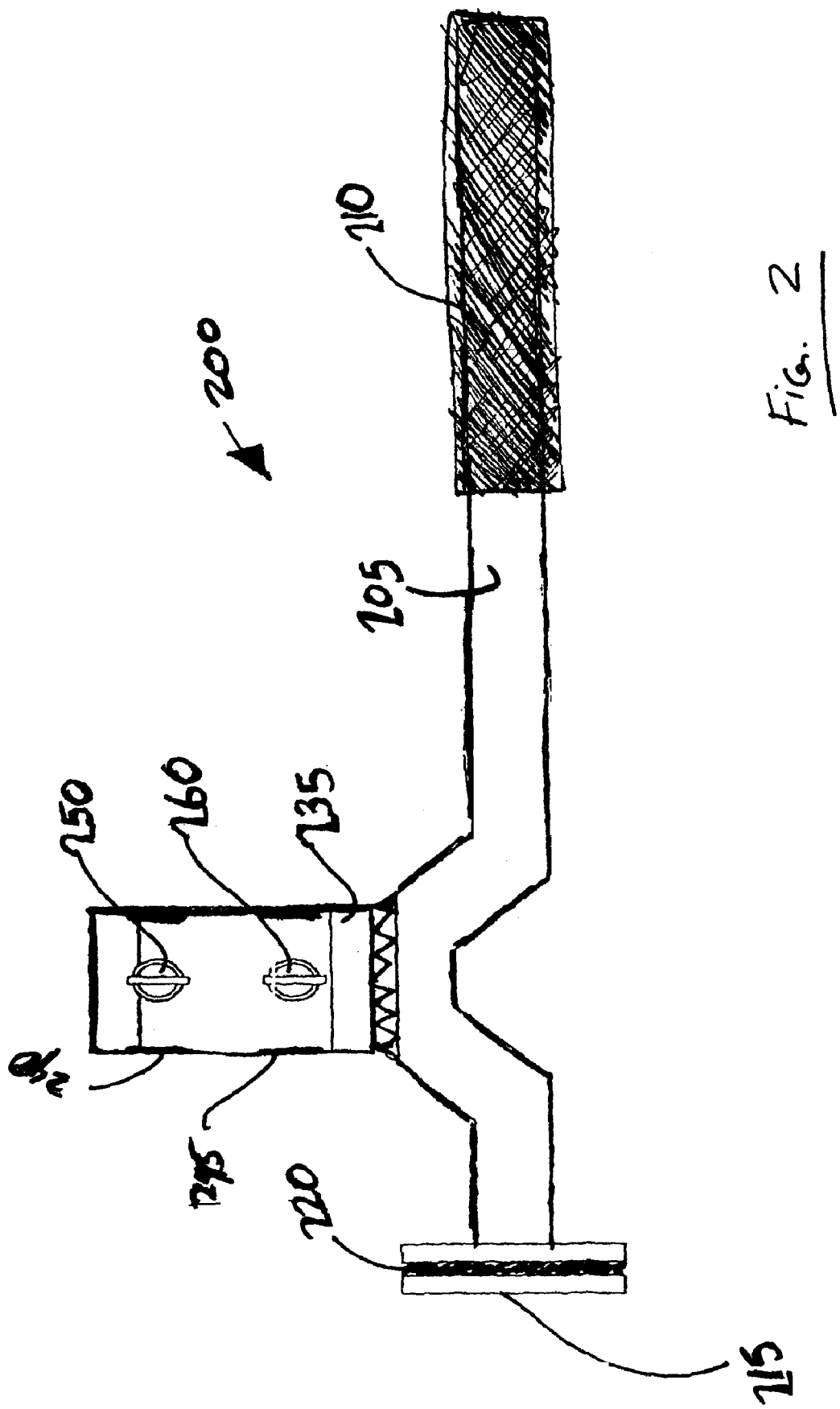
FIG. 2 is an illustration from a top view showing one embodiment of the invention.

FIG. 2 is an illustration from a top view showing one embodiment of the invention. A pipe alignment tool 200 is shown along with its constituent parts, including the handle 205, the hand grip 210, the wall-strap mount 215, and the pipe mount 235. The wall-strap mount 215 features a top opening 220 and a bottom opening, which are separated by a divider. The pipe mount 235 features a first pipe insert 240 for mounting a pipe and a second pipe insert 245 for mounting a pipe of a second size. The first pipe insert 240 features a first thumb-screw 250, which removably attaches a pipe of a first size to the tool 200 and the second pipe insert 245 features a second thumb-screw 260, which removably attaches a pipe of a second size to the tool 200.

Figure 3:
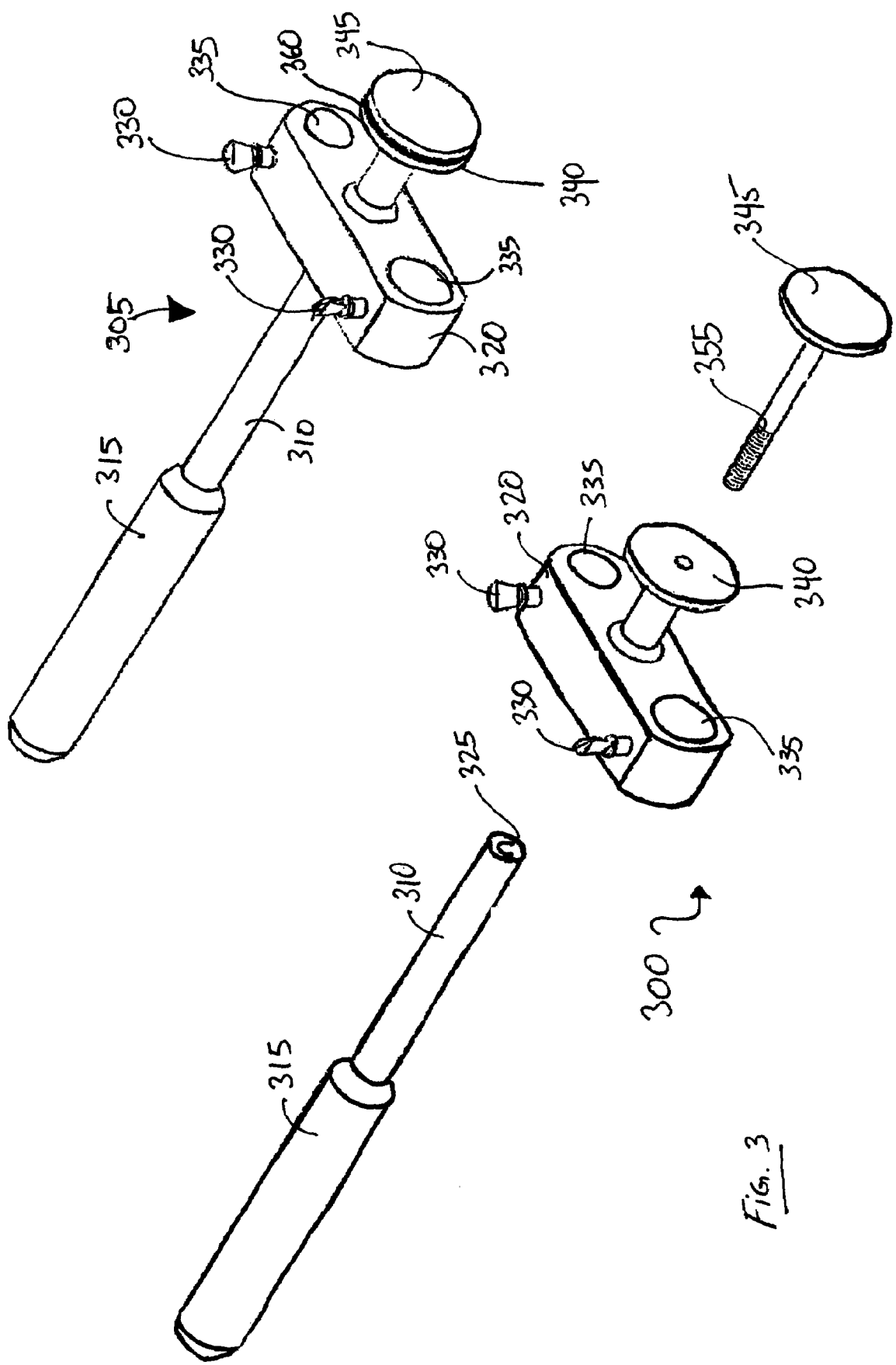
FIG. 3 illustrates an exploded and assembled view of the pipe alignment tool in various embodiments of the invention.

FIG. 3 illustrates an exploded 300 and assembled view 305 of the pipe alignment tool in various embodiments of the invention. A pipe alignment tool 300 and 305 is shown along with its constituent parts, including the handle 310, the hand grip 315, the aperture body 320, the handle attachment threading 325, the first and second pipe inserts 335, the first and second pipe insert thumb screws 330, the inside wall-strap mount 340, and the outside wall-strap mount 345 with integrated locking screw 355. When assembled, the aperture body 320 is attached to the handle 310 and removably attached by the handle integrated locking screw 335 to the handle attachment threading 325. The inside wall-strap mount 340 and the outside wall-strap mount 345 are configured such that, when finally assembled, a gap 360 is created between them that allows the pipe alignment tool 300 and 305 to be attached to a wall-strap.

What is claimed is:

1. A tool for aligning pipes and the like, comprising:
a single shaft, said shaft having a proximal end and a distal end, the proximal end of said shaft including a handle, said handle suitable for gripping said tool by the hand, the distal end of said shaft including a mount, said mount suitable for removably attaching said tool to a thin, flat surface or the like, said shaft further featuring a lateral extension, said lateral extension featuring one or more adjustable openings, said one or more openings being suitable for removably attaching one or more pipes or the like to said tool such that said one or more pipes or the like are generally perpendicular to said thin, flat surface.

2. A tool for aligning pipes and the like according to claim 1, wherein said thin, flat surface is a wall-strap and said one or more generally perpendicular pipes are soldered to said wall-strap.

3. A tool for aligning pipes and the like according to claim 1, wherein said thin, flat surface is a wall-strap.

* * * * *